Patented Sept. 25, 1934

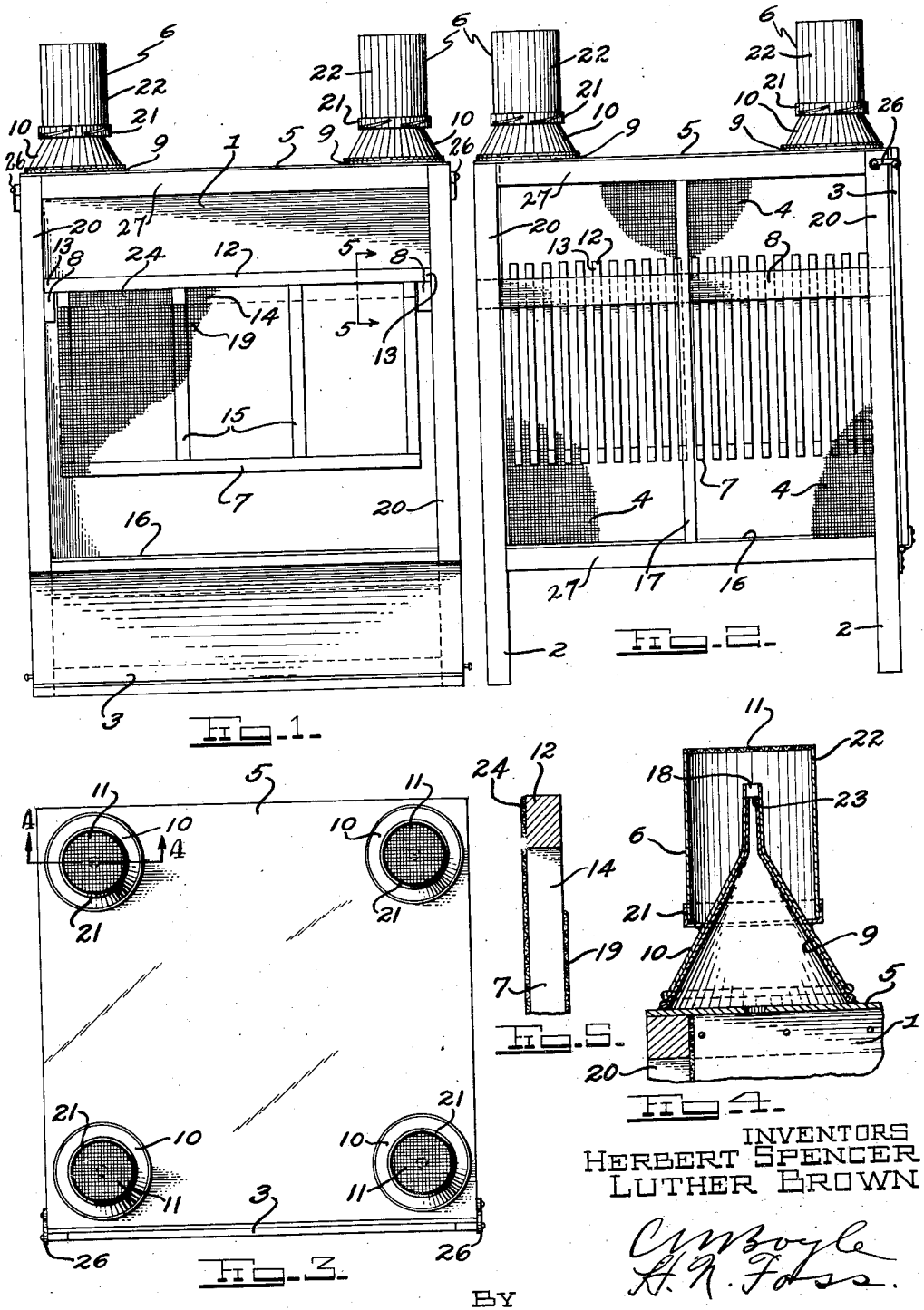

1,974,549

UNITED STATES PATENT OFFICE 1,974,549

DEVICE FOR REARING AND CAPTURING INSECTS

Herbert Spencer and Luther Brown, Albany, Ga., dedicated to the free use of the Public of the United States of America Application December 1, 1933, Serial No. 700,510

4 Claims. (Cl. 119—1)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to us of any royalty thereon.

We hereby dedicate the invention herein described to the free use of the public in the territory of the United States of America to take effect upon the granting of a patent to us.

Our invention relates to cabinets for use in the propagation of certain "host" species of insects, stages of which are required in large numbers for feeding and rearing millions of beneficial parasitic insects. These parasitic insects are distributed in orchards and cultivated crops, where they attack and kill noxious insect pests, and thus reduce the damage to the crops from the latter.

The device is illustrated in the accompanying drawing in which Fig. 1 is a front elevation of the device with the door open; Fig. 2 is a side elevation; Fig. 3 is a top plan view; Fig. 4 is a detailed view of one of the traps on the line 4—4 Fig. 2, and Fig. 5 is a sectional view of one of the trays on the line 5—5 Fig. 1, showing the entrance slot.

Essentially this cabinet consists of a rearing compartment 1 supported on short legs 2 and having a large door in front 3, having each side of fine-mesh screen wire 4 and having back and bottom of smooth solid material. The top 5, of sheet metal, is equipped with one or more trapping devices 6 for collecting the insects automatically. The interior fixtures from which especial efficiency is obtained because of new and unique design, consist of a series of vertically hanging trays 7 of narrow or thin width with sides of screen wire, supported on strips 8 at each side of the rearing compartment.

A detailed description of a definite cabinet in use in the work is given below as an example of how the principles involved may be applied in a practical way. It is not implied that the dimensions given are inflexible, or that other materials might not be substituted for construction, in working out the ideas and principles involved. Smaller or larger dimensions and other materials have been used with success, provided the essential features and combinations described herein are not departed from.

The framework of the cabinet, as used by us is of wood size 1⅝ inches by 1⅝ inches. The four corner posts 20 are thirty six inches long, eight inches at the bottom of each forming a supporting "leg" 2. Cross pieces 27 of the same material extend between corner posts at bottom and top of rearing compartment 1, making the cabinet 30 inches wide across the front, 29 inches from front to back and forty-five inches tall, with the 9-inch trapping devices 6 included. The bottom 16, back, top 5 and door 3 are of smooth 28-gauge galvanized flat sheet metal, the door 3 being reinforced with strips of 1⅝ by ¾ inch wood around the edges, and being very tightly hinged and latched as shown at 26 to the rearing compartment as shown in Fig. 2. The sides are of 60-mesh-to-the-inch brass or copper screen wire 4, which is reinforced and protected by vertical wooden strips 17¾ by 1⅝ inches.

Except the top, all flat metal surfaces on bottom, back, door and screen wire sides are attached to the inside of the wooden frame, additional ¾ by 1⅝ inch wood strips being used to permit this, where needed. In this manner the number of angles and hiding places for the insects in the rearing cabinet is reduced, following the principle that unobstructed opportunity must be presented to the insects, to gratify their tendency or "tropism", to crawl or fly upward toward the trapping devices 6.

Over four 6½ inch holes in the sheet metal top 5 near each corner, cones of sheet metal, or tapered "funnels" 9 were soldered in an inverted position. Funnels 10, similar in shape and size to the funnels 9, are provided and the screw caps 21 of the cylindrical containers 22 are soldered at the edges of perforations through the flat surfaces of the screw caps, to the spreading outward surfaces of the tapered funnels. The cylindrical containers are of sufficient length so that when they are attached at their open ends by means of a corresponding screw thread to the screw caps 21 secured to the funnels 10, the opposite ends which are closed with a 60-mesh to the inch copper screen wire 11, extend above the small openings 18 and 23 of the funnels 10 and 9, respectively, these small openings being inside the cylindrical containers. In use the funnels 10 to which the screw caps 21 and cylindrical containers 22 are attached, fit closely over the funnels 9 soldered to the cabinet top. The insects crawl upward through the small openings in the top of the cabinet into the two funnels, and into the container 22 of the trap 6 and cannot find their way back again, but are held there until needed, when the trap cans may be opened and the insects transferred to other containers. The screen wire ends of the cylindrical containers provide ventilation for the trapped insects. In transferring the insects to other containers, the funnels 10 together with the attached screw caps 21 and cylindrical containers 22 may be lifted from the funnels 9 to facilitate the removal of the insects, this being the reason for utilizing two funnels.

The rearing compartment of the cabinet is equipped internally with a number of hanging vertical thin trays 7 supported by horizontally placed side strips 8 on the inner walls of cabinet. As many as sixteen of these trays may be used in a cabinet of the size described, for holding approximately one bushel of wheat. In hot weather twelve trays may be used, with wider air spaces between, the wider spacing improving the ventilation. The trays are 26 inches long, 13⅝ inches deep and one-half inch thick; the frames are of ½" x ¾" wood, fastened together with ¼" corrugated fasteners. The top bar 12 of each frame projects one inch on each end, and this projection 13 serves for hanging the frame from the side strips. On one side of each frame a 13½ inch by 24 inch piece of 12-mesh-to-the-inch screen wire 24 is tacked, and on the other side a similar piece 19 twelve inches long fastened only to sides, braces and bottom bar. This forms a deep narrow pocket with a slot 14 at the top on one side for putting in and removing the grain. Two vertically placed pieces of ½ x ¾ inch wood 15 serve as braces and spacers, increasing the strength of the frame and preventing the weight of the grain from bulging out the screening too much. While the size of the device as a whole may be increased, the trays should always be narrow or thin, that is, the distance between the screen sides should be short as indicated above in order that the weight of the grain and the distance between the screen surfaces of the trays will not prevent the insects leaving the grain in the trays. The trays are suspended so as to leave an air space at the top, bottom and sides of the cabinet.

For use, the narrow hanging trays are filled with wheat (or other grain) that has been fumigated and treated with scalding hot water, and are hung in the rearing compartment on the side strips 8 so that they are evenly spaced apart. The maximum number that the described cabinet will hold is 16 trays, but often a smaller number is used for better ventilation, especially in hot weather. Each week for four weeks, a quarter of a million eggs of the host insect (usually the Angoumois grain moth, *Sitotroga cerealella* Oliv, although other species might be used) are added to the grain to start the infestation and rearing. Only clean, selected eggs are used in starting a cabinet. The eggs hatch, the larvæ enter the wheat kernels, grow and complete their development in 35 days, if the cabinet is kept in a room with a temperature of about 80 degrees F. They emerge from the wheat kernels as adult moths, which crawl through the 12-mesh screen wire on the tray sides, dry their wings, mate, and gradually work their way upward in the rearing compartment following their normal "tropism" of flying, jumping, or crawling upward when disturbed in any way. Many of the moths find their way through the openings in the top 5 of the cabinet into the funnels 9, and still following their natural tendency, go upward through the small spout openings 18 and 23 and are caught in the traps. Some few adult moths escape trapping in this manner, but live for a time in the rearing compartment, and deposit their eggs on the grain in the trays, which provides enough reinfestation so that no eggs need be added after the first four weeks. Since the original eggs were added in equal numbers at weekly intervals for four weeks, the yield of adult insects continues more or less uniform for a month, then increases rapidly to a level of many thousand individuals per day, which continues for two months more, before the grain is completely "used up".

Each morning the moths are removed from the traps and are placed in large battery jars, in which they lay their eggs. The eggs are brushed loose from the jars each day, are air-cleaned, and are pasted with adhesive to circles of cardboard, and are exposed to the parasites in shallow glass "petri" dishes. The parasites rear their young in these eggs, one parasite wasp adult finally emerging from each egg.

With sixteen of these improved cabinets, the Albany, Georgia Parasite Laboratory of the U. S. Department of Agriculture produced between October 1, 1932 and August 1, 1933 more than 119,000,000 eggs of the host Sitotroga, using only twenty bushels of wheat for the season.

The unique principles combined and applied in the insect rearing cabinet, are enumerated and discussed below:

1. The cabinet is a self-ventilating design. In this improved self-ventilating cabinet, air enters the cabinet through the screen-wire sides 4 and goes between the vertically-hanging trays 7 freely at bottom or sides, passes between the top bars 12 of adjacent trays, and leaves the cabinet either through the screenwire sides 4 or the screen-wire tops 11 of the cylindrical containers 22. The heat of infestation produced in the trays of grain 7 by the activities of the infesting insects provides the motive force. Heating of the air between trays which is in contact with this grain, by this "heat of infestation", causes the air between the trays 7 to rise into the space above, drawing fresh cooler air in from below through the cabinet sides 4. The heated air sweeps through the top portions of the cabinet sides 4 or through the traps 6 which have screen tops 11. The hotter the grain in the trays becomes, the faster becomes this automatic air circulation through the rearing cabinet.

The circulation of air through the traps prevents the trapped insects from smothering.

2. The vertical trays are an essential feature of the cabinet, in reality, (a) Ventilation; Heat removal: Their importance in solving the problem of ventilation has already been mentioned above. (b) Accessibility: In addition, the narrow vertical trays expose all grain kernels to the host insects, which have free access for oviposition and emergence, so that no grain is out of reach, and lost to production as in horizontal trays with solid bottoms, or deeper horizontal trays with screen bottoms. This is an economical feature, insuring maximum host insect yields from a minimum of grain. (c) Moisture removal: Because of the free circulation of air, excess moisture in the grain is removed quickly, and the infested grain does not "sour", "mold", or "heat" excessively, as often occurs with horizontal trays. (d) Removal of debris: With vertical trays, dead insects, dirt, scale-dust from moth wings, and other debris fall away from the grain to the bottom of the rearing compartment, and can be removed. With horizontal trays these fall into the mass of grain and contaminate it, shortening its usefulness and favoring "molding", "souring" and "heating" as mentioned above.

3. Trapping devices: The use of an inherent tendency of the insect species, for collection of said insects, is not encountered in any other similar device. The insects trap themselves. This reduces the labor costs of the work greatly, and is considered an important feature of the described cabinet.

4. Pest control: The tight construction, and screening of all openings with screen of very fine mesh, reduces the possibility of entrance of any of the other undesirable parasites, which in the past have embarrassed such rearing efforts greatly. A multiplicity of cabinet units is also possible, so that contaminated or "used-up" cabinets may be discontinued, fumigated, and restocked without interference with clean, producing units.

Having fully disclosed our discovery we claim as our invention:

1. A device for rearing and capturing insects, comprising a cabinet, a series of removable, spaced, screened, thin trays, vertically suspended in said cabinet, the screen of the trays being of large enough mesh to permit the passage of the insect to be reared, open spaces to permit access to the interior of said screened trays, means to removably suspend the trays in the cabinet, means to self-ventilate the cabinet, opening and closing means to permit access to the interior of the cabinet, small openings in the top of the cabinet, inverted tapering funnels rigidly secured to the top of the cabinet over said openings, tapering funnels similar in shape and size to the first mentioned funnels, positioned on, over, and continuously adjacent to the first mentioned funnels, perforated screw caps secured to the spreading sides of the second mentioned funnels and cylindrical containers removably attached by screw thread means to the screw caps, said cylindrical containers extending above and enclosing the upper and smaller openings of the funnels, the free end of each container being closed with fine mesh wire screen.

2. A device for rearing and capturing insects comprising a cabinet, a series of removable, spaced, thin trays vertically suspended in said cabinet, the sides of the trays being formed substantially of wire screen of a mesh large enough to permit the passage of the insect to be reared, open spaces to permit access to the interior of said trays, means to removably suspend the trays in the cabinet, means for self-ventilation of the cabinet, opening and closing means to permit access to the interior of the cabinet, and means to trap insects after they leave the trays.

3. In a device for rearing and capturing insects and having a cabinet, a series of removable, spaced, thin trays, vertically suspended in the cabinet, the sides of the trays being formed substantially of wire screen of a mesh large enough to permit the passage of the insect to be reared and having open spaces to permit access to the interior of said trays.

4. In an apparatus for use in rearing and capturing insects and having a cabinet, a trapping device associated with said cabinet comprising an inverted tapered funnel, a second funnel similar in shape and size to the first mentioned funnel, superimposed over the first mentioned funnel and practically co-extensive therewith, a perforated screw cap rigidly secured at the edges of the perforation to the spreading sides of the second mentioned funnel, a cylindrical container removably attached by screw thread means to the screw cap, said cylindrical container extending beyond and enclosing the smaller openings of the funnels, the free end of the container being closed with a fine mesh screen and an opening in the cabinet to permit access from the cabinet to the larger opening of the first mentioned funnel.

HERBERT SPENCER.
LUTHER BROWN.